Feb. 18, 1930.  E. G. DUDEN  1,747,470
WATER TREATING APPARATUS
Filed March 29, 1927   2 Sheets-Sheet 1

INVENTOR
Emil G. Duden
By Green & McCallister
His attorneys

Feb. 18, 1930. E. G. DUDEN 1,747,470
WATER TREATING APPARATUS
Filed March 29, 1927 2 Sheets-Sheet 2
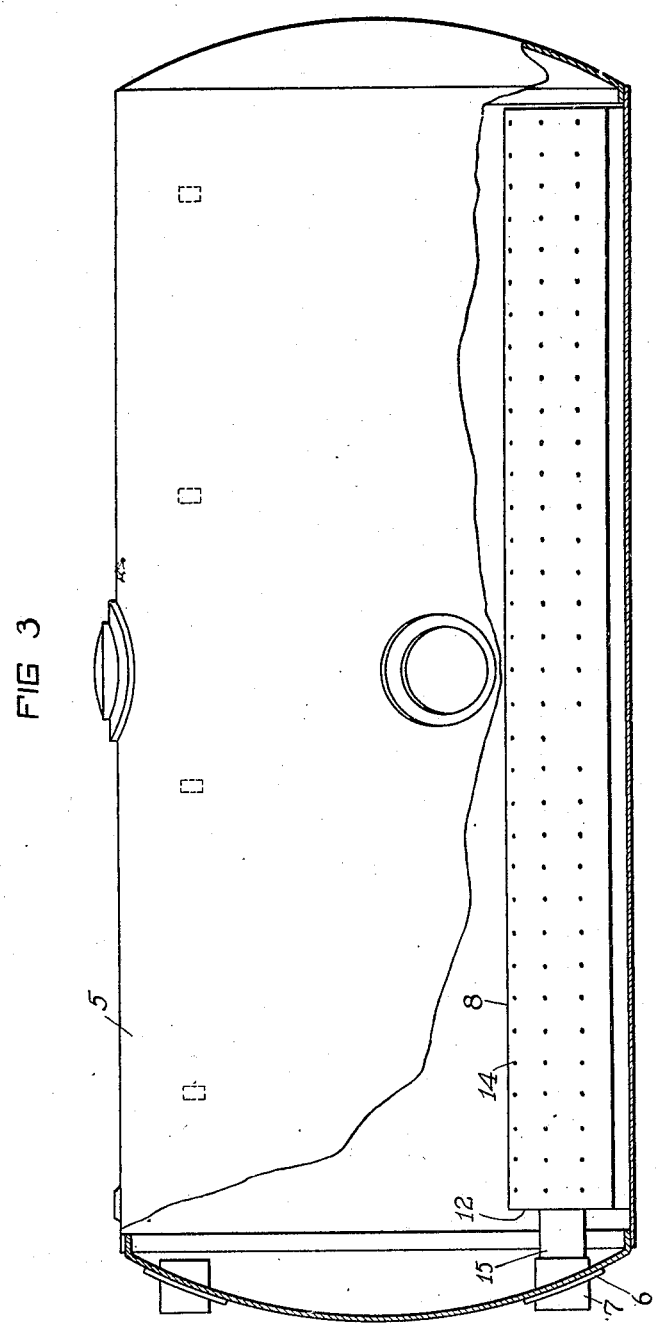
INVENTOR
Emil G. Duden
By Green and McCallister
His Attorneys Patented Feb. 18, 1930 1,747,470

UNITED STATES PATENT OFFICE

EMIL G. DUDEN, OF OAKMONT, PENNSYLVANIA, ASSIGNOR TO WM. B. SCAIFE & SONS CO., A CORPORATION OF PENNSYLVANIA

WATER-TREATING APPARATUS

Application filed March 29, 1927. Serial No. 179,318.

This invention relates to water treating apparatus such, for example, as filters, softeners and the like.

Devices of this type generally include a water treating chamber in the form of a steel shell or drum which is provided with a water manifold at the top and a second manifold at the bottom. Suitable water treating agents such as filtering material, water softening material or the like are placed in the chamber between the two manifolds so that water entering the chamber through one must pass through such material before entering the other and being conveyed to a point of consumption. It has been customary to provide a cement filling or bottom within the shell around and beneath the lower manifold for the purpose of supporting a load of treating material, which in the case of filters, for example, consists of heavy sand and gravel.

An object of this invention is to provide an improved construction of apparatus of the type set forth which will eliminate the necessity for this heavy, cumbersome and expensive cement or similar filling.

A further object is to provide an apparatus of the type set forth having a simplified construction which will be cheaper and simpler to manufacture and assemble than has heretofore been possible, without detracting from the rugged and enduring qualities of such mechanisms.

Figure 1:
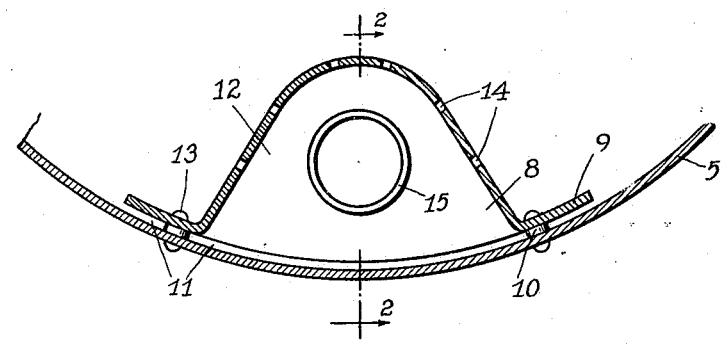
Figure 2:
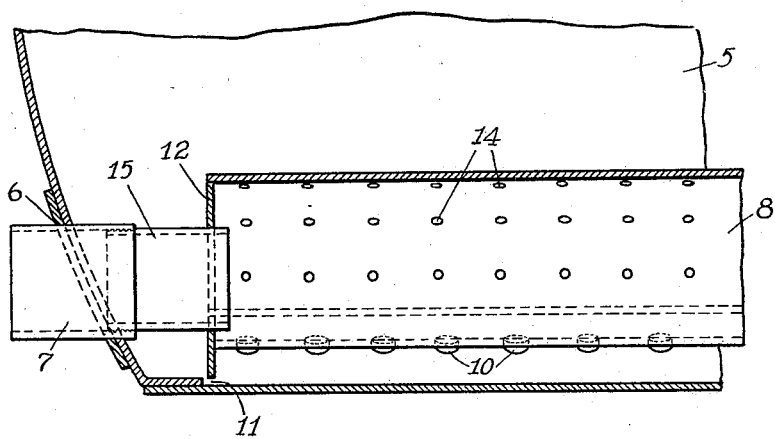

These and other objects which will be apparent to those skilled in this particular art are accomplished by means of the present invention which is illustrated in the accompanying drawings, in which Figure 1 is a transverse sectional view through the bottom only of a steel shell forming a water treating chamber and illustrating one embodiment of the present invention. Fig. 2 is a longitudinal sectional view along the line 2—2 of Fig. 1 illustrating one lower end of the bottom of the water treating chamber, and Fig. 3 is a partial section of a treating chamber showing the relative arrangement of the parts.

The particular embodiment of the present invention which has been chosen for the purposes of illustration includes a water manifold or underdrain which is adapted to be mounted directly on the bottom of the shell and communicates directly with the adjacent port formed therein. In the case of a filter this manifold, underdrain or box serves as a collecting strainer of filtered water and also as a distributing system for wash water in cleaning the water treating material as will be readily understood by those skilled in this art. The manifold is in the form of an inverted box or trough having a plurality of water passing openings formed therein and the structure is secured directly to the bottom of the water treating shell from which it is spaced by supporting spacers so as to provide a continuous opening for the passage of water adjacent the material of the shell around the entire length of the trough or box. The box is so formed as to provide not only a water manifold but also a load supporting structure for directly carrying the weight of the water treating material such as, for example, sand and gravel in the case of filters. In order to obtain the greatest load carrying capacity from the material used the structure is substantially arch shaped in cross section and the water treating material is placed in the shell directly over the arch shaped inverted trough.

The illustrated embodiment of the invention is shown in connection with a water treating chamber formed by a steel shell 5 of ordinary and well known construction having a port 6 through which a water pipe 7 extends. A manifold or water box 8 of inverted trough form having longitudinally extending flanges 9 formed along the side edges thereof is mounted upon spacers 10 along the bottom of the shell so as to provide a water passage 11 entirely around the water box between the side edges and ends 12 thereof and the adjacent shell. Rivets 13 may conveniently be used for securing the device in place.

The trough, manifold, or underdrain 8 is not only formed so as to cooperate with the wall of the shell to provide a water manifold but also constitutes a load supporting structure which is itself capable of carrying the load of water treating material placed within the shell, thus eliminating the necessity for a concrete filling or bottom as hitherto employed. As illustrated, this is accomplished by making the trough arch shape in cross section so as to obtain the greatest load carrying capacity from the material employed.

The structure has a plurality of rows of water passing openings or perforations 14 which, together with the water-passageway 11, provide a collecting strainer of filtered water, when the device is used as a filter, and a distributing system for wash water or the like for cleaning or otherwise treating the material within the chamber. A nipple 15 is employed for connecting the water pipe 7 with the water box or manifold 8. The arch shaped cross section of the trough provides a load supporting structure capable of withstanding the load of water treating material placed in the chamber without the necessity of the cement filling or bottom hitherto employed with ordinary types of manifolds.

It is to be noted that the widest part of underdrain or water box 8 lies along a chord of less length than the diameter of the tank. For this reason, the underdrain 8 supports only that portion of the filter bed (not shown) which is directly above the under-drain, and the portions of the filter bed on each side thereof are supported by the wall of the tank 5.

When water is passing downwardly through the filter bed, it passes through the perforations 14 and the passageway 11 into the under-drain. After a filter bed has been in use for a considerable length of time, mud or silt collects or is deposited at the top layers of the bed. Such deposits increase the resistance to the flow of water through the filter bed and create a relatively high pressure drop between the top of the filter bed and the underdrain. In practice, the filter bed is washed or cleaned when this pressure reaches a value of about five pounds per square inch.

The filter bed may be washed by passing water into the under-drain and upwardly through the filter bed. By reason of the shape and construction of the under-drain 8, the wash water will pass upwardly through the bed and be uniformly distributed through the entire area of the bed. This result obtains because that portion of the bed directly above the under-drain 8 receives wash water that passes through the perforations 14 of the under-drain, while the portions of the bed on each side of the under-drain receive water that passes through the passageway 11. By the form of construction employed in the under-drain 8, low velocity wash-water may be effectively employed, a factor that is conducive both to low operating cost and efficient and effective washing of the filter bed.

Although I have described what I now consider to be the preferred embodiment of this invention it will be apparent that various changes, additions, substitutions and omissions can be made in the various details thereof without departing from the spirit of the invention or the scope of the appended claims.

What I claim as new and desire to secure by Letters Patent is:

1. The combination with the shell of a fluid treating chamber adapted to contain a bed of treating material, an arched fluid-passing, material-supporting structure of less area than the bed of material, means for securing said arched structure to said shell in spaced relation thereto so as to provide a slot for the passage of fluid between said shell and the bottom of said structure, and a fluid conveying pipe communicating with the interior of said structure through said shell, said slot extending entirely around the lower edge of said arched structure.

2. The combination with the substantially cylindrical shell of a fluid treating chamber adapted to contain a bed of water treating material, an elongated arched fluid passing, material supporting structure of less area than the bed of material supported thereby and extending longitudinally along the bottom of said shell, means for securing the longitudinal edges of said arched structure to said shell in spaced relation thereto so as to provide a slot for the passage of fluid between said shell and said edges, end closures for said structure located away from the adjacent walls of the shell having their lower edges located in spaced relation to the bottom of said shell and a fluid conveying pipe communicating with the interior of said structure through one of said end-closures.

3. The combination in filtering apparatus, of a tank circular in cross-section, an inverted perforated trough substantially arc-shaped in section within the tank and extending along the bottom thereof, lateral flanges extending outwardly from the sides of said trough, and means for spacing said flanges from the bottom of the tank to provide water passageways between said flanges and the bottom of the tank; the widest portion of said trough lying along a chord of less length than the diameter of said tank.

4. The combination in filtering apparatus, of a tank, a perforated water box located within the tank and extending along the bottom thereof; said box being inverted with reference to the tank bottom and of arc shape in section; said box having outwardly extending side flanges located adjacent the bottom of the tank, and means for supporting said flanges in spaced relation to the tank bottom to provide water passageways between the box flanges and tank bottom.

5. The combination in filtering apparatus, of a tank and an underdrain for said tank comprising a water box arc-shaped in section and open on one side; said box being positioned within the tank with its open side adjacent the tank bottom; said box adjacent its open side being provided with outwardly extending lateral flanges, and means for spacing said flanges from the tank bottom so as to provide water passageways between said flanges and the tank bottom.

6. In combination, a tank adapted to contain a filter bed, an under-drain for said filter bed comprising an inverted perforated trough substantially arc-shaped in section located within the tank and disposed along the median line of the tank bottom, outwardly extending lateral flanges along the sides of said trough, and means for supporting the trough in spaced relation to the bottom of the tank whereby water passageways are provided between said flanges and the tank bottom.

In testimony whereof, I have hereunto subscribed my name this 11th day of March, 1927.

EMIL G. DUDEN.